US011807451B2

(12) United States Patent
Zhan

(10) Patent No.: US 11,807,451 B2
(45) Date of Patent: *Nov. 7, 2023

(54) FORK AND CARRYING ROBOT

(71) Applicant: HAI ROBOTICS CO., LTD., Shenzhen (CN)

(72) Inventor: Qingxin Zhan, Shenzhen (CN)

(73) Assignee: HAI ROBOTICS CO., LTD., Shenzhen (CN)

( * ) Notice: Subject to any disclaimer, the term of this patent is extended or adjusted under 35 U.S.C. 154(b) by 56 days.

This patent is subject to a terminal disclaimer.

(21) Appl. No.: 18/074,716

(22) Filed: Dec. 5, 2022

(65) Prior Publication Data
US 2023/0108131 A1 Apr. 6, 2023

Related U.S. Application Data

(63) Continuation-in-part of application No. 17/697,527, filed on Mar. 17, 2022, now Pat. No. 11,548,770, which is a continuation-in-part of application No. PCT/CN2020/115764, filed on Sep. 17, 2020.

(30) Foreign Application Priority Data

Sep. 17, 2019 (CN) .......................... 201921546485.9

(51) Int. Cl.
*B65G 1/04* (2006.01)
*B66F 9/14* (2006.01)

(52) U.S. Cl.
CPC ............ *B65G 1/0435* (2013.01); *B65G 1/0421* (2013.01); *B66F 9/149* (2013.01)

(58) Field of Classification Search
CPC ........... B65G 1/0435; B66F 9/149; B66F 9/19; B66F 9/195; B66F 9/141
See application file for complete search history.

(56) References Cited

U.S. PATENT DOCUMENTS 4,856,956 A * 8/1989 Zur .................... B65G 1/0435
414/280
8,790,061 B2 7/2014 Yamashita
(Continued)

FOREIGN PATENT DOCUMENTS

| CN | 101088908 A | 12/2007 |
| CN | 101958020 A | 1/2011 |
| CN | 104619613 A | 5/2015 |
| CN | 105705441 A | 6/2016 |
| CN | 207748386 U | 8/2018 |
| CN | 208022646 U | 10/2018 |
| CN | 208217598 U | 12/2018 |

(Continued)

OTHER PUBLICATIONS

International Search Report for PCT/CN2020/115764.
(Continued)

*Primary Examiner* — Mark C Hageman

(57) ABSTRACT

The application relates to a carrying robot including a fork. The fork includes a telescopic arm and a temporary storage tray. The telescopic arm includes a fixed arm and a movable arm connected to the fixed arm. The movable arm is telescopically movable relative to the fixed arm. The temporary storage tray is mounted to the fixed arm and is configured to temporarily store goods. The temporary storage tray is able to extend relative to the fixed arm. An extending direction of the temporary storage tray is consistent with an extending direction of the movable arm. When the fork pulls in or pushes out the goods, containers can be stably transferred between a stationary rack and the temporary storage tray.

21 Claims, 9 Drawing Sheets

(56) References Cited

U.S. PATENT DOCUMENTS

| | | | |
|---|---|---|---|
| 10,618,732 B2* | 4/2020 | Iwata et al. | B65G 1/137 |
| 10,815,055 B2* | 10/2020 | Overfield et al. | B65G 1/0435 |
| 11,414,312 B2* | 8/2022 | Nobata et al. | B65G 1/0435 |
| 2019/0352092 A1 | 11/2019 | Zheng et al. | |
| 2022/0194700 A1* | 6/2022 | Fujita et al. | B66F 9/07 |

FOREIGN PATENT DOCUMENTS

| | | | |
|---|---|---|---|
| CN | 208499400 U | 2/2019 | |
| CN | 208666177 U | 3/2019 | |
| CN | 109748027 A | 5/2019 | |
| CN | 109941653 A | 6/2019 | |
| CN | 209023571 U | 6/2019 | |
| CN | 209210300 U | 8/2019 | |
| CN | 110271805 A | 9/2019 | |
| CN | 211056639 U | 7/2020 | |
| DE | 3020791 A1 | 12/1981 | |
| DE | 10140643 A1 | 11/2002 | |
| JP | H08268552 A | 10/1996 | |
| JP | H11079321 A | 3/1999 | |
| JP | 2008019097 A | 1/2008 | |
| JP | 2008100774 A | 5/2008 | |
| JP | 2011162278 A | 8/2011 | |
| JP | 2016060624 A | 4/2016 | |
| JP | 2017007786 A | 1/2017 | |
| WO | 2004103883 A1 | 12/2004 | |
| WO | 2010049987 A1 | 5/2010 | |
| WO | 2011158422 A1 | 12/2011 | |
| WO | 2019095803 A1 | 5/2019 | |

OTHER PUBLICATIONS

Non-final office action U.S. Appl. No. 17/697,527.
Search Report from Chinese patent office for the priority patent CN201921546485.9, as well as its English translation.

* cited by examiner

FORK AND CARRYING ROBOT

CROSS-REFERENCE TO RELATED APPLICATIONS

This application is a continuation-in-part of U.S. Pat. Application No. 17/697,527 filed on Mar. 17, 2022, which is a continuation-in-part of International Patent Application No. PCT/CN2020/115764 filed on Sep. 17, 2020, which claims priority to Chinese Patent Application No. 201921546485.9 filed on Sep. 17, 2019, both of which are incorporated herein by reference in their entireties.

TECHNICAL FIELD

This application relates to the field of intelligent warehousing, and in particular, to a fork and a carrying robot.

BACKGROUND

Intelligent warehousing is a link in the logistics chain. The use of intelligent warehousing ensures the speed and accuracy of data input in all steps of warehouse management, so as to ensure that enterprises can grasp the real data of the inventory timely and accurately, and properly maintain and control the enterprise's inventory. Batches and shelf life of warehouse goods can be conveniently managed by means of scientific coding. By using the storage location management function of the SNHGES system, current locations of all warehouse goods can be grasped more timely, which is conducive to improving the efficiency of warehouse management.

The carrying robot plays an important role in the intelligent warehousing. The carrying robot replaces the manual carrying of goods, but when the existing carrying robot is carrying containers, the containers are unstable and easy to fall off.

SUMMARY

Based on this, it is necessary to provide a fork and a carrying robot to resolve the problem of instability of a container when the conventional carrying robot carries the container.

The fork provided in this application includes a telescopic arm, a temporary storage tray, and a sliding assembly. The telescopic arm includes a fixed arm, a movable arm, a pusher assembly, and a driving assembly. One end of the movable arm is connected to the fixed arm, and an other end thereof is connected to the pusher assembly. The movable arm is extendable and retractable relative to the fixed arm with an action of the driving assembly. The pusher assembly is configured to pull in or push out goods during telescopic movement of the movable arm. The temporary storage tray is mounted to the fixed arm and is configured to temporarily store the goods pulled by the pusher assembly. The sliding assembly is mounted between the fixed arm and the temporary storage tray and is capable of pushing the temporary storage tray to make the temporary storage tray extend relative to the fixed arm. An extending direction of the temporary storage tray is consistent with an extending direction of the movable arm.

In an embodiment, the sliding assembly includes a spring. One end of the spring is connected to the fixed arm, and an other end thereof is connected to the temporary storage tray.

In an embodiment, the sliding assembly includes a spring, a guide rod, and a sliding block. The guide rod is fixed to the fixed arm. The spring and the sliding block are sleeved on the guide rod. The temporary storage tray is connected to the sliding block, and the temporary storage tray and the sliding block are slidable along the guide rod with an elastic action of the spring.

In an embodiment, a stopper is further disposed on the guide rod to prevent the temporary storage tray and the sliding block from slipping off the guide rod.

In an embodiment, a rib is disposed on the temporary storage tray, and a connecting plate is disposed on the movable arm. When the movable arm retracts relative to the fixed arm with the action of the driving assembly, the connecting plate abuts against the rib, so that the temporary storage tray is pushed to retract relative to the fixed arm.

In an embodiment, the movable arm includes a first arm section and a second arm section. The first arm section is mounted to the fixed arm, and the second arm section is mounted to the first arm section. The driving assembly includes a first driving assembly and a second driving assembly. The first arm section is telescopically movable relative to the fixed arm with an action of the first driving assembly, and the second arm section is telescopically movable relative to the first arm section with an action of the second driving assembly.

In an embodiment, the first driving assembly is disposed on the fixed arm and includes a chain wheel mechanism and a driving member. An output end of the driving member is connected to a driving chain wheel of the chain wheel mechanism. A connecting plate is disposed on the first arm section, and the connecting plate is fixedly connected to a link chain of the chain wheel mechanism.

In an embodiment, the second driving assembly includes a movable pulley and a strop. The movable pulley is mounted to the first arm section, and a middle part of the strop is bent, so that two ends of the strop are disposed opposite to each other. The middle part of the strop is sleeved on the movable pulley, one end of the strop is fixedly connected to the fixed arm, and an other end thereof is fixedly connected to the second arm section. The movable pulley and the strop form a movable pulley structure.

In an embodiment, the pusher assembly includes a movable pusher, a fixed pusher, and a pusher driving member. The movable pusher is mounted to a top end of the second arm section, and the fixed pusher is mounted to an end of the second arm section facing away from the movable pusher. The pusher driving member is connected to the movable pusher and is configured to drive the movable pusher to be folded or unfolded relative to the second arm section. The movable pusher is configured to pull the goods to the temporary storage tray during retraction of the movable arm, and the fixed pusher is configured to push out the goods on the temporary storage tray during the extension of the movable arm.

This application further provides a carrying robot, including a robot body and a handling device. The handling device includes a rotary assembly, a fork bracket, and any of the forks described above. The fork bracket is mounted to the robot body, and the fork and the rotary assembly are both mounted to the fork bracket. The fork is rotatable relative to the fork bracket in a vertical direction with an action of the rotary assembly.

In an embodiment, the robot body includes a movable chassis, a shelving unit, and a lifting assembly. The shelving unit is mounted to the movable chassis, the shelving unit includes more than two shelf board assemblies distributed at different heights, and each shelf board assembly includes a shelf board for placing goods. The lifting assembly is configured to drive the handling device to rise or fall relative to the shelving unit, so that the fork is at a same height as one of the shelf boards.

According to the fork and the carrying robot provided in this application, the sliding assembly is disposed between the fixed arm of the handling device and the temporary storage tray. The sliding assembly is capable of pushing the temporary storage tray to make the temporary storage tray extend relative to the fixed arm, and the extending direction of the temporary storage tray is consistent with the extending direction of the movable arm. Therefore, when the fork of this application pulls in or pushes out the goods, the container can be stably transferred between a stationary rack and the temporary storage tray and will not fall off during the transfer.

Figure 1:
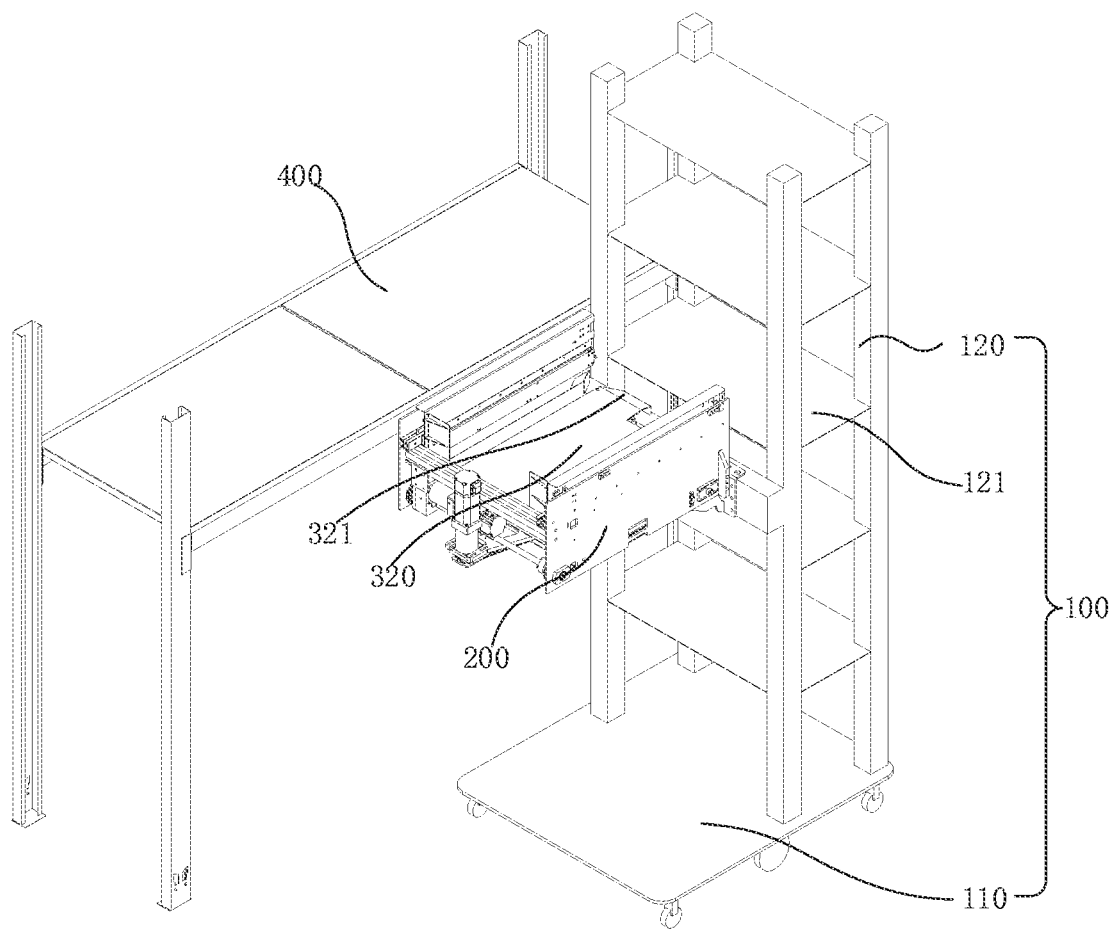
FIG. 1 is a schematic structural diagram of a carrying robot in an initial state according to an embodiment of this application.

Reference numerals:

Robot body 100, Movable chassis 110, Shelving unit 120, Shelf board 121; Handling device 200, Rotary assembly 210, Fork bracket 220, Symmetry axis S1, Fork 300, Fixed arm 311, Underframe 317, Side wall 318, Movable arm 312, First arm section 313, Connecting plate 314, Second arm section 315, Top end 316, Temporary storage tray 320, Free end 321, Rib 322, Sliding assembly 330, Spring 331, Guide rod 332, Sliding block 333, Stopper 334, Pusher assembly 340, Movable pusher 341, Fixed pusher 342, Pusher driving member 343, First driving assembly 350, Chain wheel mechanism 351, Driving member 352, Second driving assembly 360, Movable pulley 361, Strop 362; and Stationary rack 400.

DETAILED DESCRIPTION

For ease of understanding this application, this application is described more comprehensively below with reference to the accompanying drawings. Exemplary embodiments of this application are provided in the accompanying drawings. However, this application may be implemented in many different forms, and is not limited to the embodiments described in this specification. On the contrary, an objective of providing the embodiments is to make the understanding of the disclosure content of this application more clearly and comprehensively.

It should be noted that, when a component is referred to as "being fixed to" another component, the component may be directly or indirectly on the another component. When the component is indirectly fixed to the another component, it means that there may be one or more intermediate components between them.

When a component is considered to be "connected to" another component, the component may be directly or indirectly connected to the another component. When the component is indirectly connected to the another component, it means that there may be one or more intermediate components between them. The terms "connect", "attach", and "couple" can be used in an interchangeable manner.

When a component is "mounted" to another component, the component may be directly or indirectly mounted to the another component. When the component is indirectly mounted to the another component, it means that there may be one or more intermediate components between them. It should be noted that when the component is "mounted" to the another component, the component may be fixedly or movably mounted to the another component. The terms "mount" and "install" may be used in an interchangeable manner.

The terms "vertical", "horizontal", "left", "right" and similar expressions used in this specification are merely for purposes of illustration but not indicate a unique way for implementation.

Unless otherwise defined, meanings of all technical and scientific terms used in this specification are the same as those usually understood by a person skilled in the art to which this application belongs. In this application, terms used herein are merely intended to describe the specific embodiments, but are not intended to limit this application. The term "and/or" used in this specification includes any and all combinations of one or more related listed items.

Figure 2:
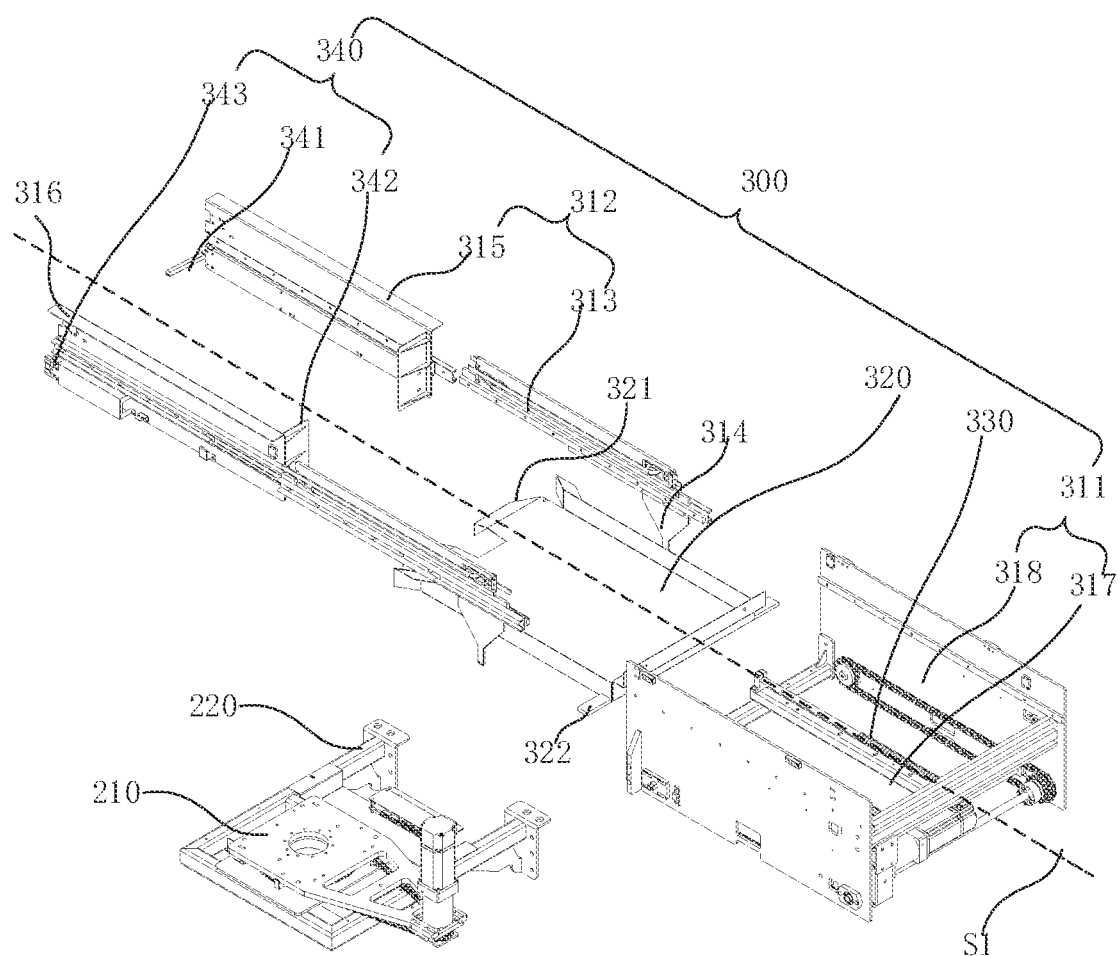
FIG. 2 is a schematic diagram of an exploded structure of a handling device according to an embodiment of this application.

FIG. 1 is a schematic structural diagram of a carrying robot in an initial state according to an embodiment of this application. As shown in FIG. 1, in an embodiment, the carrying robot includes a robot body 100 and a handling device 200. The robot body 100 includes a movable chassis 110, a shelving unit 120, and a lifting assembly (not shown in the figure). In an embodiment, the movable chassis 110 includes a plurality of wheels and at least one motor configured to drive the movable chassis 110 to move on a floor in a facility (e.g., a warehouse, a factory, or a distribution center). The shelving unit 120 is mounted to the movable chassis 110, and the shelving unit 120 includes more than two shelf board assemblies distributed at different height. Each shelf board assembly includes a shelf board 121 for placing goods. The lifting assembly is configured to drive the handling device 200 to rise or fall relative to the shelving unit 120, so that the handling device 200 is at the same height as the shelf board 121 or a stationary rack 400. In an embodiment, the lifting assembly includes a transmission mechanism and at least one motor configured to drive the transmission mechanism to move. The transmission mechanism includes one of a synchronous pulley and a synchronous sprocket. The handling device 200 is fixedly connected to the transmission mechanism so that the handling device 200 can be driven to move in a vertical direction with the motor. FIG. 2 is a schematic diagram of an exploded structure of a handling device according to an embodiment of this application. As shown in FIG. 2, the handling device 200 includes a rotary assembly 210, a fork bracket 220, and a fork 300. The fork bracket 220 is mounted to the shelving unit 120 and can be lifted or lowered relative to the shelving unit 120 with an action of a lifting assembly. The fork 300 and the rotary assembly 210 are both mounted to the fork bracket 220. The fork 300 is rotatable relative to the fork bracket 220 around a vertical direction with an action of the rotary assembly 210. The fork 300 is used for carrying goods to the shelf board 121 at the same height as the fork 300 or used for moving out the goods from the shelf board 121 at the same height as the fork 300.

Figure 3:
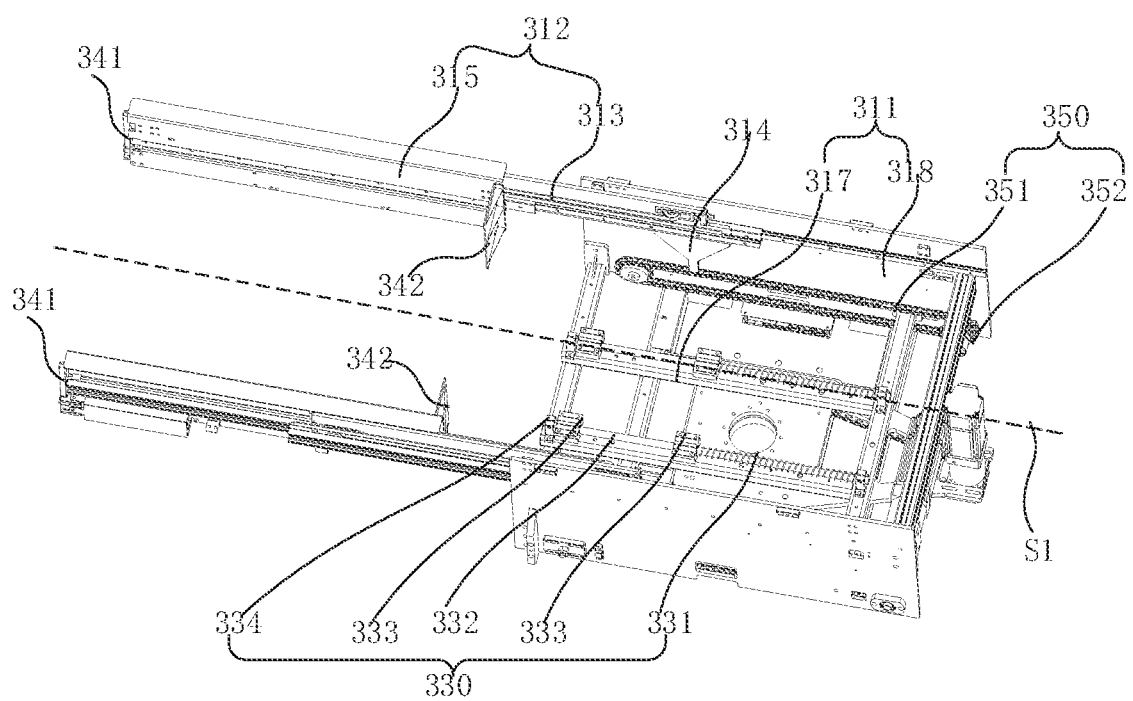
FIG. 3 is a schematic structural diagram of a movable arm of a handling device in an extended state according to an embodiment of this application.

FIG. 3 is a schematic structural diagram of a movable arm of a handling device in an extended state according to an embodiment of this application. As shown in FIG. 2 and FIG. 3, the fork 300 is provided with a symmetry axis S1 and includes a telescopic arm, a temporary storage tray 320, and a sliding assembly 330. The telescopic arm includes a fixed arm 311, a movable arm 312, a pusher assembly 340, and a driving assembly. The fixed arm 311 includes an underframe 317 and two side walls 318 that are fixedly connected to the underframe 317. The underframe 317 is mounted to the rotary assembly 210. One end of the movable arm 312 is connected to the side wall 318 of the fixed arm 311, and an other end thereof is connected to the pusher assembly 340. The movable arm 312 is telescopically movable relative to the fixed arm 311 along the symmetry axis S1 with an action of the driving assembly. The pusher assembly 340 is configured to pull in or push out goods during the telescopic movement of the movable arm 312, and the temporary storage tray 320 is mounted to the underframe 317 of the fixed arm 311 and is used for temporarily storing the goods pulled by the pusher assembly 340. The sliding assembly 330 is mounted between the underframe 317 of the fixed arm 311 and the temporary storage tray 320, and is capable of pushing or pulling the temporary storage tray 320 to cause the temporary storage tray 320 to extend relative to the fixed arm 311 along the symmetry axis S1. An extending direction of the temporary storage tray 320 is consistent with an extending direction of the movable arm 312.

In some embodiments, the side walls 318 are movably connected to the underframe 317. For example, each of the side walls 318 may move in a lateral direction relative to the underframe 317. The "lateral direction" is a direction which is perpendicular to the extension direction of the telescopic arm.

It should be noted that it is not limited to shape and size of the temporary storage tray 320, as long as the temporary storage tray 320 is able to move relative to the fixed arm 311 and is able to temporarily store the goods pulled by the pusher assembly 340. The width of the temporary storage tray 320 may be narrower than a distance between the two fixed arms 311. In an embodiment, the width of the temporary storage tray 320 is half the distance of the two side walls 318. In some other embodiments, the width of the temporary storage tray 320 is basically the same as the distance of the two side walls 318, however, a little bit less than the distance of the two side walls 318 so that the temporary storage tray 320 is able to move between the two side walls 318 relative to the fixed arm 311.

Figure 5:
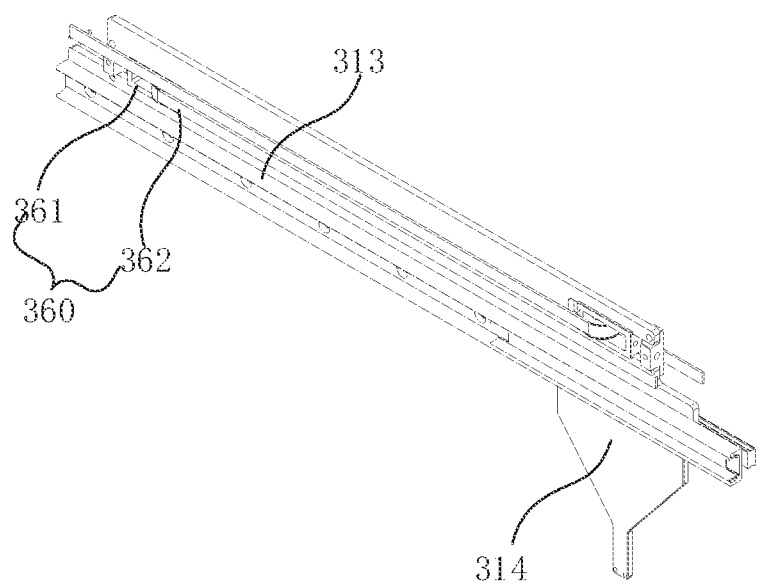
FIG. 5 is a schematic structural diagram of a first arm section according to an embodiment of this application.
Figure 6:
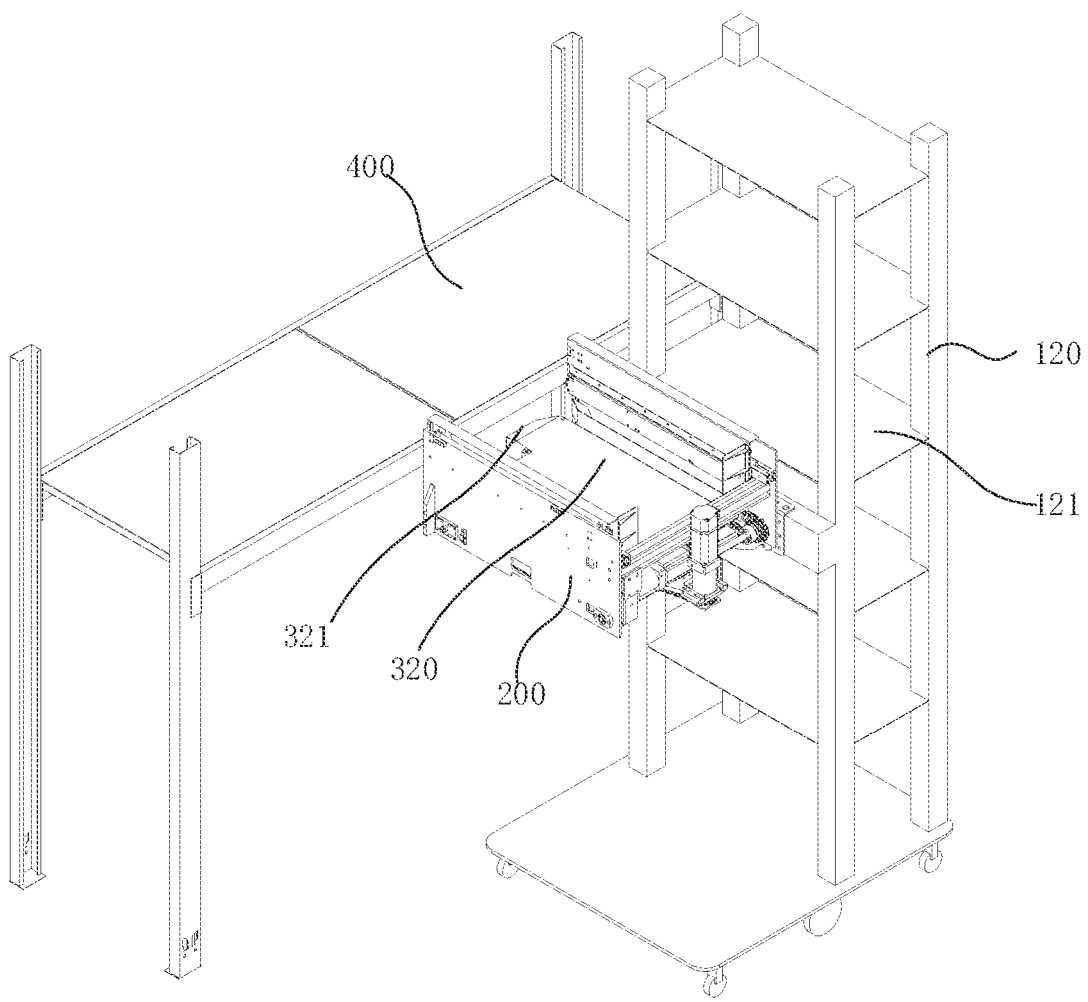
FIG. 6 is a schematic diagram of a handling device when facing to a stationary rack according to an embodiment of this application.

Further, in an embodiment, as shown in FIG. 2 and FIG. 3, quantities of the side walls 318 of the fixed arm 311 and the movable arms 312 are both two. The two side walls 318 and the two movable arms 312 are symmetrically disposed on two opposite sides of the symmetry axis S1. Each movable arm 312 includes a first arm section 313 and a second arm section 315. The first arm section 313 is mounted to the fixed arm 311, and the second arm section 315 is mounted to the first arm section 313. FIG. 5 is a schematic structural diagram of a first arm section according to an embodiment of this application, and FIG. 6 is a schematic structural diagram of a handling device when facing to a stationary rack according to an embodiment of this application. As shown in FIG. 5 and FIG. 6, the driving assembly includes a first driving assembly 350 and a second driving assembly 360. The first arm section 313 is telescopically movable relative to the fixed arm 311 with an action of the first driving assembly 350, and the second arm section 315 is telescopically movable relative to the first arm section 313 with an action of the second driving assembly 360. In a specific embodiment, as shown in FIG. 3, the fixed arm 311 is an outer arm, the first arm section 313 is a middle arm, and the second arm section 315 is an inner arm. The middle arm is mounted to an inner side of a side wall of the outer arm, and the inner arm is mounted to an inner side of the middle arm. The middle arm is telescopically movable relative to the outer arm with the action of the first driving assembly 350, and the inner arm is telescopically movable relative to the middle arm with the action of the second driving assembly 360. It may be understood that, in another specific embodiment, the fixed arm 311 may further be an inner arm, the first arm section 313 is a middle arm, and the second arm section 315 is an outer arm. The middle arm is mounted to an outer side of a side wall of the inner arm, and the outer arm is mounted to an outer side of the middle arm. In addition, according to an actual condition, the number of movable arms 312 is not limited to two, and in other embodiments, the number of movable arms 312 may be one. In addition, it may be understood that, in another embodiment, the movable arm 312 may include only the inner arm, but not the middle arm. The inner arm is mounted to the inner side of the side wall of the outer arm, and the inner arm is telescopically movable relative to the outer arm along the symmetry axis S1 with the action of the driving assembly. In still another embodiment, the movable arm 312 may include an inner arm and more than two middle arms. The movable arm 312 is telescopically movable relative to the outer arm along the symmetry axis S1 with the action of the driving assembly. In an embodiment, the first driving assembly 350 may include a motor configured to drive the first arm section 313 to move relative to the fixed arm 311, and the second driving assembly may 360 include a motor configured to drive the second arm section 315 to move relative to the first arm section 313.

Figure 4:
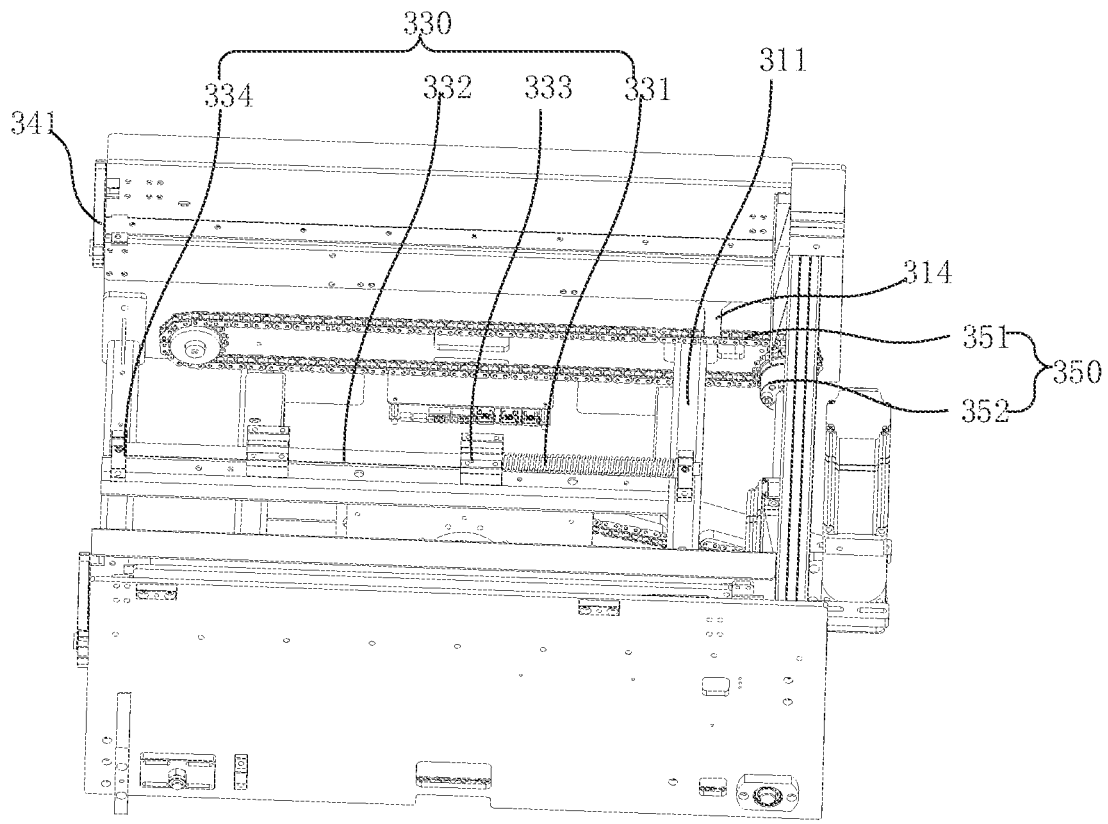
FIG. 4 is a schematic structural diagram of a movable arm of a handling device in a retracted state according to an embodiment of this application.
Figure 7:
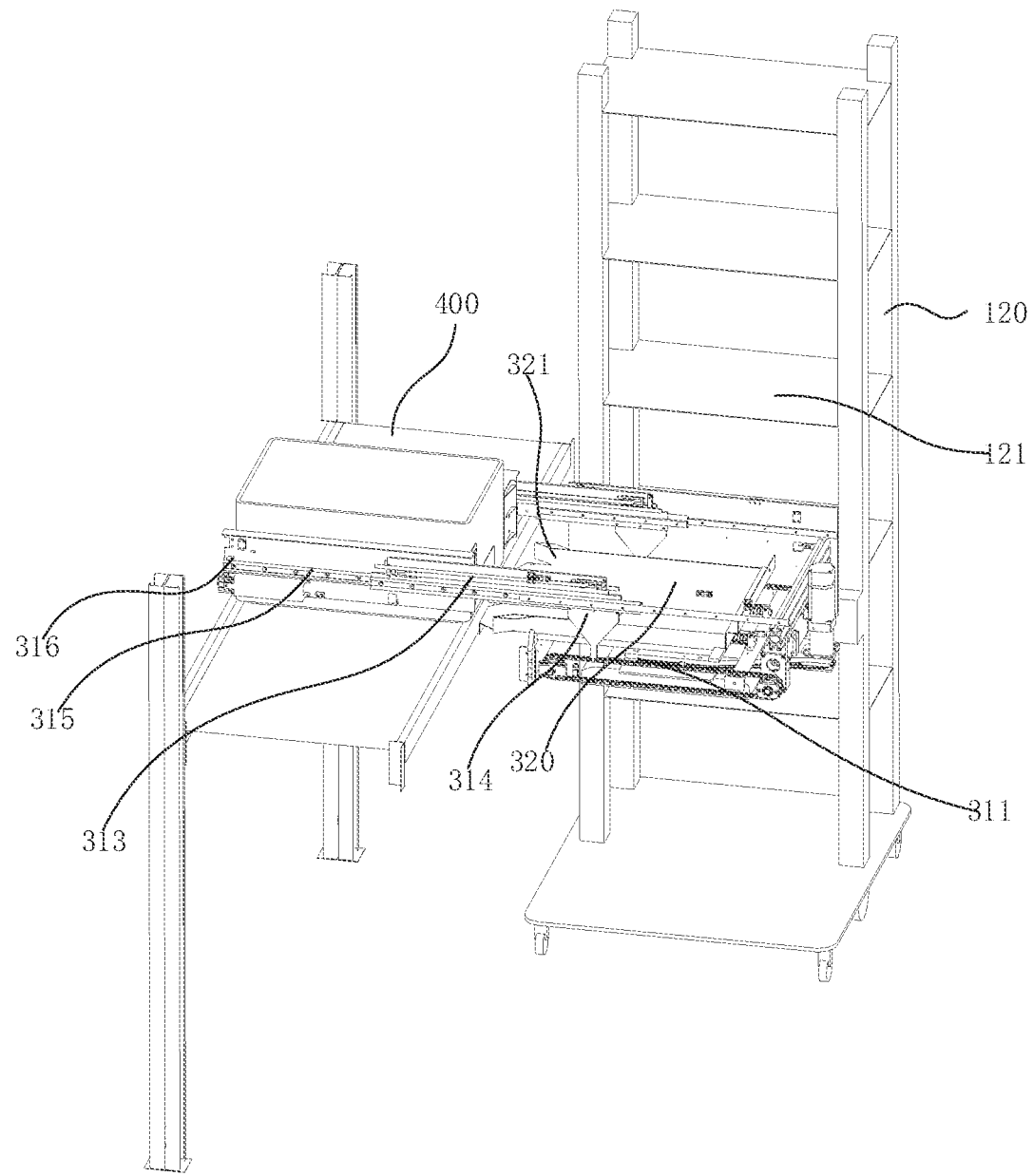
FIG. 7 is a schematic structural diagram of a handling device when pulling goods according to an embodiment of this application.

In an embodiment, as shown in FIG. 2, the sliding assembly 330 includes a spring 331. One end of the spring 331 is connected to the underframe 317 of the fixed arm 311, and an other end thereof is connected to the temporary storage tray 320. The temporary storage tray 320 extends relative to the fixed arm 311 with the push of an elastic force of the spring 331. FIG. 7 is a schematic structural diagram of a handling device when pulling goods according to an embodiment of this application. As shown in FIG. 7, when the temporary storage tray 320 extends relative to the fixed arm 311, a free end 321 of the temporary storage tray 320 may protrude from the fixed arm 311. FIG. 4 is a schematic structural diagram of a movable arm of a handling device in a retracted state according to an embodiment of this application.

In an embodiment, as shown in FIG. 3 and FIG. 4, the sliding assembly 330 includes a spring 331, a guide rod 332, and a sliding block 333.

The guide rod 332 is fixed to the fixed arm 311, and the spring 331 and the sliding block 333 are both sleeved on the guide rod 332. The temporary storage tray 320 is connected to the sliding block 333, and the temporary storage tray 320 and the sliding block 333 are slidable along the guide rod 332 with the elastic action of the spring 331. It should be noted that the sliding block 333 may be a component separate from the guide rod 332 and the fixed arm 311. The sliding block 333 may be a part of the temporary storage tray 320 or may be integrally formed with the temporary storage tray 320. The guide rod 332 may be a rod mounted to the fixed arm 311. As an alternative manner, the guide rod 332 may also be a rod integrally formed with the fixed arm 311.

Alternatively, in an embodiment, the guide rod 332 may be mounted to the temporary storage tray 320, and the spring 331 and the sliding blocking 333 are sleeved on the guide rod 332. An end of the sliding block 333 is fixedly connected to the fixed arm 311, and another end of the sliding blocking 333 is connected to the spring 331. The spring 331 is connected to the temporary storage tray 320.

Further, optionally, a stopper 334 is provided on the guide rod 332 to prevent the temporary storage tray 320 and the sliding block 333 from slipping off the guide rod 332.

It should be noted that the elastic piece of the sliding assembly 330 is not limited to the spring 331. Any other type of the elastic piece may be used, as long as the elastic piece can provide the elastic force. In an embodiment, the spring 331 is used as the elastic piece. In some other embodiments, the elastic piece is a metal plate with elastic force, or a rubber band.

It should be noted that this application does not limit the number of guide rods 332, sliding blocks 333, and springs 331 in the sliding assembly 330. In the embodiment shown in FIG. 3 and FIG. 4, two guide rods 332 are disposed, four sliding blocks 333 are disposed, and two springs 331 are disposed. It may be understood that, in other embodiments, one guide rod or other number of guide rods 332 may be disposed, one sliding block or other number of sliding blocks 333 may be disposed, and one spring or other number of springs 331 may be disposed.

In an embodiment, as shown in FIG. 2, the pusher assembly 340 is mounted to the second arm section 315. The pusher assembly 340 includes a fixed pusher 342, a movable pusher 341, and a pusher driving member 343. The movable pusher 341 is mounted to a top end 316 of the second arm section 315. It may be understood that the top end 316 mentioned herein refers to an end farthest from the fixed arm 311 when the movable arm 312 extends relative to the fixed arm 311 along the symmetry axis S1. The fixed pusher 342 is fixedly mounted to an end of the second arm section 315 facing away from the movable pusher 341, and the pusher driving member 343 is connected to the movable pusher 341 for driving the movable pusher 341 to be folded or unfolded relative to the second arm section 315. When the movable pusher 341 is unfolded relative to the second arm section 315, the movable pusher 341 protrudes from the second arm section 315 in a direction close to the symmetry axis S1, as shown in FIG. 2. When the movable pusher 341 is folded relative to the second arm section 315, the movable pusher 341 and the second arm section 315 substantially overlap, as shown in FIG. 3. In a specific embodiment, the pusher driving member 343 is a pusher motor. The movable pusher 341 is directly driven by the pusher motor. The pusher motor is configured to drive the movable pusher 341 to rotate relative to the second arm section 315, so that the movable pusher 341 is unfolded or folded relative to the second arm section 315. It may be understood that, according to the actual condition, in other embodiments, the movement manner of the movable pusher 341 is not limited to rotation. For example, the movable pusher 341 may extend out of the second arm section 315 or retract into the second arm section 315.

Figure 8:
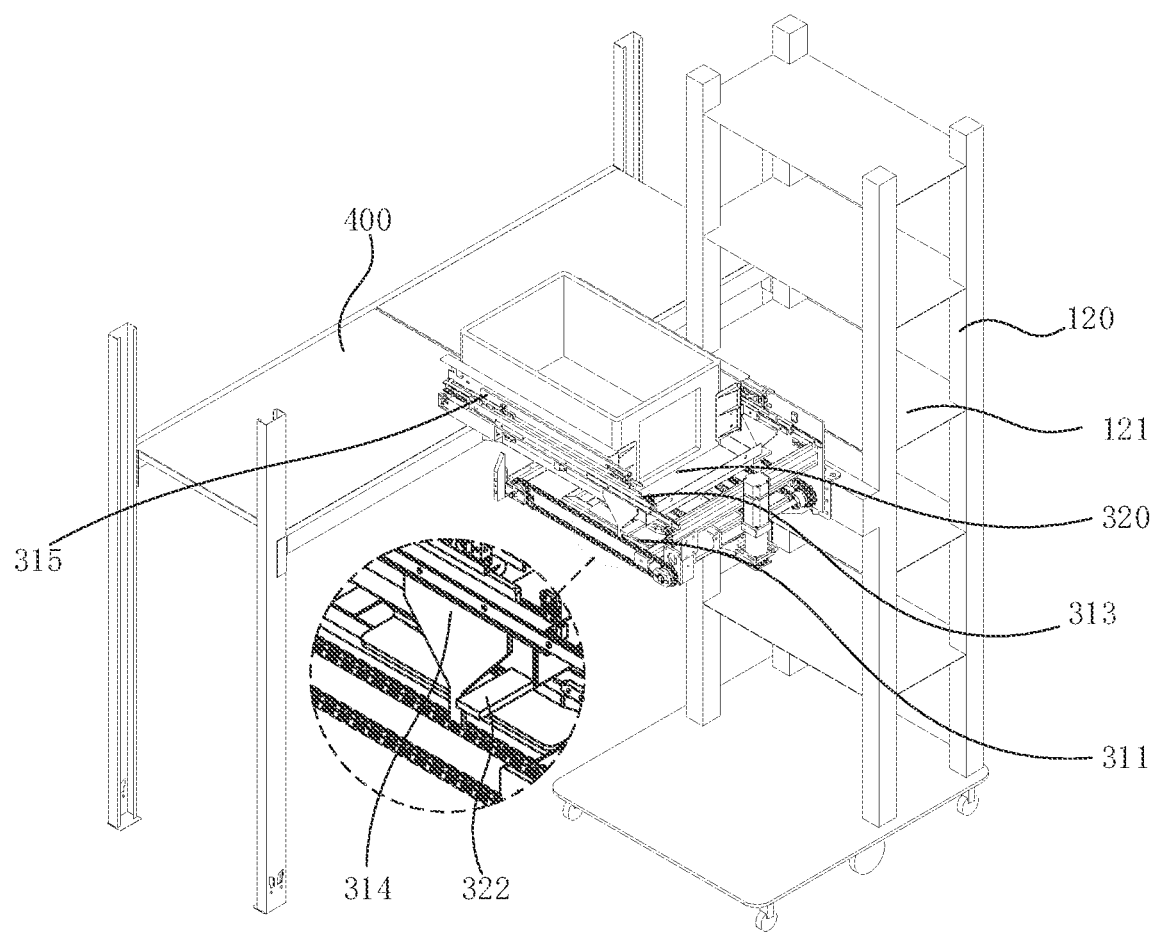
FIG. 8 is a schematic structural diagram during retraction of a movable arm after a handling device pulls goods according to an embodiment of this application.

In an embodiment, as shown in FIG. 3 and FIG. 4, the first driving assembly 350 is disposed on the fixed arm 311 and includes a chain wheel mechanism 351 and a driving member 352. An output end of the driving member 352 is connected to a driving chain wheel of the chain wheel mechanism 351. The first arm section 313 is provided with a connecting plate 314, and the connecting plate 314 is fixedly connected to a link chain of the chain wheel mechanism 351. The first driving assembly 350 is configured to drive the driving chain wheel to rotate. Since the first arm section 313 is fixedly connected to the link chain of the chain wheel mechanism 351 by using the connecting plate 314, the chain wheel mechanism 351 can drive, by using the connecting plate 314, the first arm section 313 to move relative to the fixed arm 311 along the symmetry axis S1. As shown in FIG. 2, the temporary storage tray 320 is provided with a rib 322. FIG. 8 is a schematic structural diagram of a movable arm when retracting after a handling device pulls goods according to an embodiment of this application. As shown in FIG. 8, when the first arm section 313 retracts relative to the fixed arm 311 with the action of the first driving assembly 350, the connecting plate 314 abuts against the rib 322. Therefore, the temporary storage tray 320 can be pushed to retract relative to the fixed arm 311, and the temporary storage tray 320 is pushed back to the original position. When the temporary storage tray 320 is pushed back to the original position, as shown in FIG. 4, the spring 331 is in a compressed state, and the temporary storage tray 320 is blocked by the connecting plate 314 and is located on the underframe 317 of the fixed arm 311. Once the connecting plate 314 extends relative to the fixed arm 311 along with the first arm section 313 with the action of the first driving assembly 350, as shown in FIG. 7, the temporary storage tray 320 loses obstruction and is pushed out with an elastic restoring force of the spring 331, so that the free end 321 of the temporary storage tray 320 protrudes from the fixed arm 311. It should be noted that a direction in which the temporary storage tray 320 is pushed out by the spring 331 is consistent with a direction in which the movable arm 312 extends relative to the fixed arm 311. In an embodiment, the driving member 352 includes a motor.

It may be understood that, according to the actual condition, the chain wheel mechanism 351 of the first driving assembly 350 may be replaced with a pulley mechanism or the like. For example, the pulley mechanism includes a flat pulley and a belt. The connecting plate 314 is fixedly connected to the belt. When the driving member 352 drive the pulley to rotate, the connecting plate 314 is driven to move along with the belt.

In addition, it should be noted that in the embodiment shown in FIG. 4, the spring 331 is a compression spring. It may be understood that in other embodiments, the spring 331 may be a tension spring. For example, when the temporary storage tray 320 is in the original position, an end of the spring 331 on the guide rod 332 is fixedly mounted to an end of the underframe 317 close to the free end 321, another end of the spring 331 is fixedly connected to the sliding block 333, and the sliding block 333 is connected to an end of the temporary storage tray 320 away from the free end 321. When the temporary storage tray 320 is pushed back to the original position, the spring 331 is in a stretched state, and the connecting plate 314 blocks the temporary storage tray 320, and the temporary storage tray 320 is located on the underframe 317 of the fixed arm 311. Once the connecting plate 314 extends relative to the fixed arm 311 along with the first arm section 313 with the action of the first driving assembly 350, the temporary storage tray 320 loses obstruction and is pulled out with the elastic restoring force of the spring 331.

It should be noted that it is not limited to the above manner of abutment of the horizontally disposed rib 322. There may be another manner for the movable arm 312 abutting against the rib 322 of the temporary storage tray 320. For example, in an embodiment, the rib 322 may be a plate vertically disposed on an upper surface of the temporary storage tray 320, and the fixed pusher 342 fixedly connected to the movable arm 312 may be used to abut against the vertically disposed rib 322 when the movable arm 312 retracts relative to the fixed arm 311.

Optionally, in an embodiment, the temporary storage tray 320 is pushed out by the movable arm 312 to extend relative to the fixed arm 311, and the temporary storage tray 320 is pulled with an elastic force of the elastic piece (e.g., the spring 331) to retract relative to the fixed arm 311. For example, when the movable arm 312 extends relative to the fixed arm 311, a component (e.g., the connecting plate 314 or the fixed pusher 342) of the movable arm 312 abuts against the rib 322 of the temporary storage tray 320 and the temporary storage tray 320 is pushed to extend relative to the fixed arm 311. The free end 321 of the temporary storage tray 320 therefore protrudes from the fixed arm 311. When the movable arm 312 retract relative to the fixed arm 311, the temporary storage tray 320 loses obstruction and is pulled with the elastic force of the elastic piece, and the temporary storage tray 320 therefore retracts relative to the fixed arm 311.

In an embodiment, as shown in FIG. 5, the second driving assembly 360 includes a movable pulley 361 and a strop 362. The movable pulley 361 is mounted to the first arm section 313, and a middle part of the strop 362 is bent, so that two ends of the strop 362 are disposed opposite to each other. The middle part of the strop 362 is sleeved on the movable pulley 361, one end of the strop 362 is fixedly connected to the fixed arm 311, and an other end thereof is fixedly connected to the second arm section 315. The movable pulley 361 and the strop 362 form a movable pulley structure. When the first arm section 313 moves at a first speed relative to the fixed arm 311, the second arm section 315 moves at a second speed relative to the fixed arm 311. The second speed is twice the first speed. By disposing a movable pulley mechanism, the extension or retraction speed of the second arm section 315 can be faster, and the efficiency of picking and placing goods of the fork is improved. In a specific embodiment, the movable pulley 361 is a flat pulley, and the strop 362 is an open-loop flat belt. It may be understood that, in other embodiments, the movable pulley 361 may be a chain wheel, and the strop 362 may be a link chain.

It should be noted that, in an embodiment, the sliding assembly 330 may include a motor configured to drive the temporary storage tray 320 to extend or retract relative to the fixed arm 311. For example, the sliding assembly 330 may include a rack mounted to one of the temporary storage tray 320 and the fixed arm 311, a gear mounted to another of the temporary storage tray 320 and the fixed arm 311, and a motor configured to drive the gear to rotate. In some other embodiments, the transmission mechanism including the gear and rack may be replaced with a chain wheel mechanism or a pulley mechanism.

When the handling device 200 is in an initial state, as shown in FIG. 1, the free end 321 of the temporary storage tray 320 is provided towards the shelving unit 120. The carrying robot carries a container on the stationary rack 400 to the shelf board 121 of the shelving unit 120 by performing the following steps. Step 1: The handling device 200 is raised or lowered relative to the shelving unit 120 with an action of the lifting assembly, so that the symmetry axis S1 of the fork 300 is at a same height as the container on the stationary rack 400. Step 2: As shown in FIG. 6, the fork 300 rotates with an action of the rotary assembly 210, so that the container is located on the symmetry axis S1 of the fork 300, and the free end 321 of the temporary storage tray 320 is oriented towards the container on the stationary rack 400. It should be noted that, in the embodiments shown in FIG. 1 and FIG. 6, the container on the stationary rack 400 is not shown in the figures. Step 3: As shown in FIG. 7, the movable arm 312 extends relative to the fixed arm 311 along the symmetry axis S1 with the action of the driving assembly. At the same time, the temporary storage tray 320 loses the blocking of the connecting plate 314 and is then pushed out with the action of the elastic restoring force of the spring 331, so that the free end 321 of the temporary storage tray 320 protrudes from the fixed arm 311, and the free end 321 of the temporary storage tray 320 is closer to the stationary rack 400. Optionally, the free end 321 of the temporary storage tray 320 may abut against the stationary rack 400 when the temporary storage tray 320 is in a state where the temporary storage tray 320 protrudes from the fixed arm 311. In addition, in step 3, the movable pusher 341 mounted to the top end 316 of the second arm section 315 is folded relative to the second arm section 315, and the top end 316 of the second arm section 315 moves from a side of the container towards the temporary storage tray 320 to a side of the container away from the temporary storage tray 320. Step 4: The movable pusher 341 is unfolded relative to the second arm section 315 with an action of the pusher driving member 343, and then the movable arm 312 retracts relative to the fixed arm 311 along the symmetry axis S1 with the action of the driving assembly, so that the movable pusher 341 can pull the container onto the temporary storage tray 320. As shown in FIG. 8, when the movable arm 312 retracts to a certain extent, the connecting plate 314 on the first arm section 313 abuts against the rib 322 on the temporary storage tray 320, and the second arm section 315 continues to retract relative to the fixed arm 311 along the symmetry axis S1 with the action of the driving assembly, and pushes the temporary storage tray 320 to cause the temporary storage tray 320 to retract relative to the fixed arm 311 along the symmetry axis S1, thereby pushing the temporary storage tray 320 back to the original position.

Figure 9:
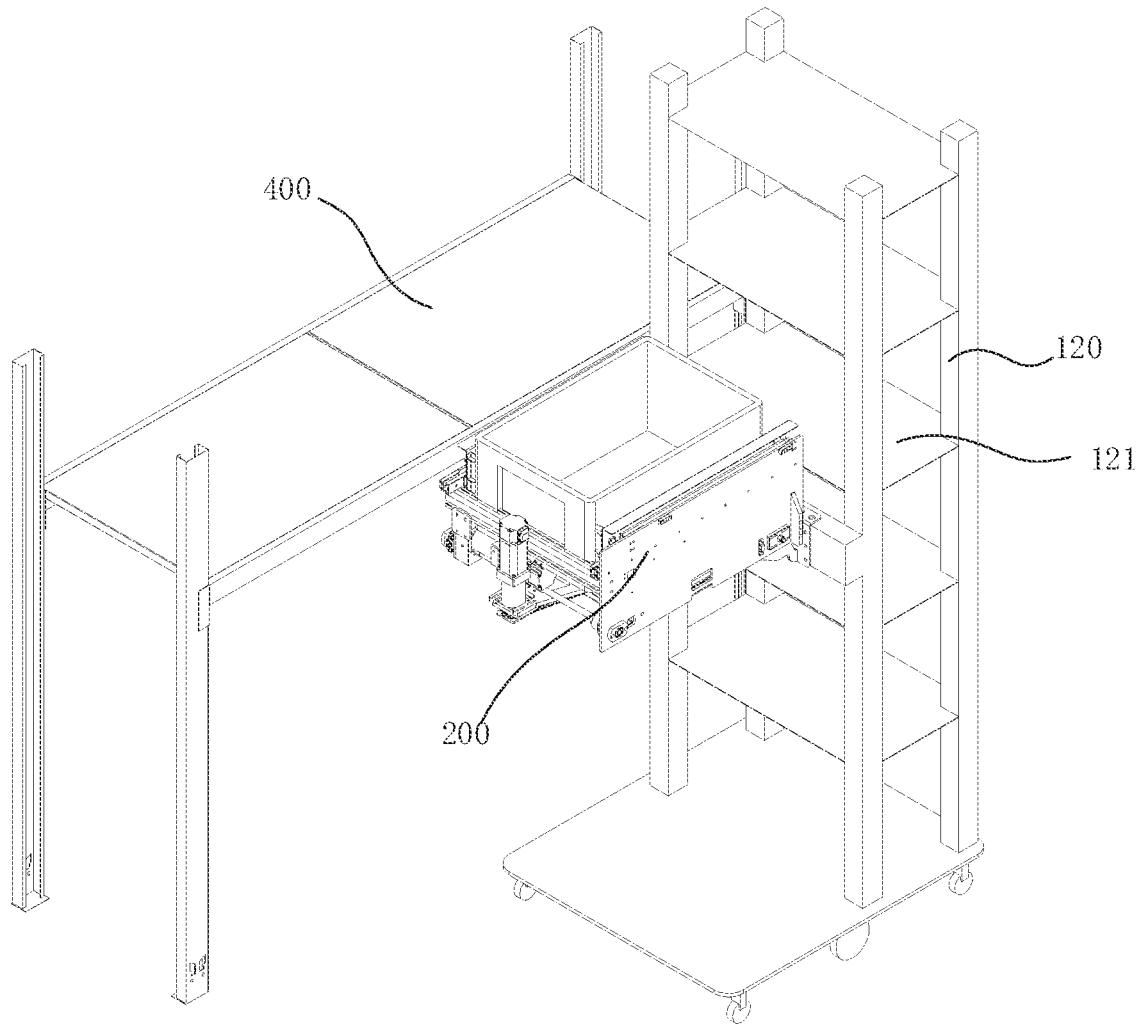
FIG. 9 is a schematic structural diagram of a handling device when facing to a shelving unit according to an embodiment of this application.
Figure 10:
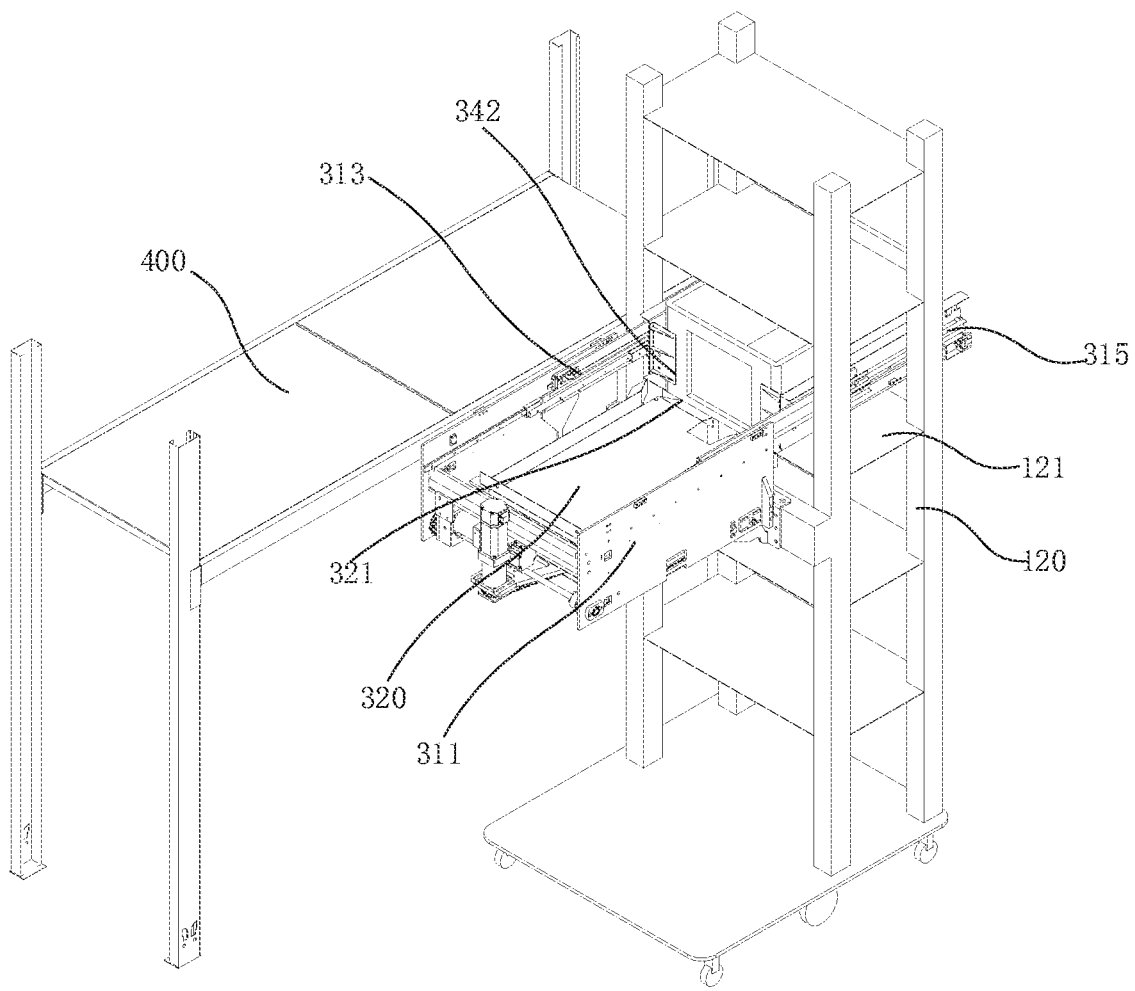
FIG. 10 is a schematic structural diagram during pushing of goods on a temporary storage tray to a shelving unit by a handling device according to an embodiment of this application.

Step 5: FIG. 9 is a schematic structural diagram of a handling device when orienting towards a shelving unit according to an embodiment of this application. As shown in FIG. 9, the fork 300 rotates with an action of the rotary assembly 210, so that the free end 321 of the temporary storage tray 320 orients towards the shelf board 121 on the shelving unit 120. Step 6: The handling device 200 is lifted or lowered relative to the shelving unit 120 with the action of the lifting assembly, so that the symmetry axis S1 of the fork 300 is at the same height as one empty shelf board 121 on the shelving unit 120. Step 7: FIG. 10 is a schematic structural diagram of a handling device when pushing goods on a temporary storage tray to a shelving unit according to an embodiment of this application. As shown in FIG. 10, the movable arm 312 extends relative to the fixed arm 311 along the symmetry axis S1 with an action of the driving assembly. At the same time, the temporary storage tray 320 loses the blocking of the first arm section 313 and is then pushed out by the elastic restoring force of the spring 331, so that the free end 321 of the temporary storage tray 320 protrudes from the fixed arm 311, and the temporary storage tray 320 is closer to the shelf board 121 on the shelving unit 120. Optionally, the free end 321 of the temporary storage tray 320 may abut against the shelf board 121 when the temporary storage tray 320 is in a state where the temporary storage tray 320 protrudes from the fixed arm 311. During the extending of the movable arm 312, the container is pushed onto the empty shelf board 121 of the shelving unit 120 by the fixed pusher 342. In addition, in step 7, the movable pusher 341 mounted to the top end 316 of the second arm section 315 may be folded relative to the second arm section 315 or may be unfolded relative to the second arm section 315. In this embodiment, the movable pusher 341 is unfolded relative to the second arm section 315, and the unfolded movable pusher 341 can prevent the container from falling from another end of the shelf board 121. Step 8: The movable pusher 341 is folded relative to the second arm section 315 with the action of the pusher driving member 343 (in another embodiment, this step may also be performed in step 5, step 6, or step 7. If the movable pusher 341 has been folded relative to the second arm section 315 in step 7, then this step can be omitted in step 8). The movable arm 312 retracts relative to the fixed arm 311 along the symmetry axis S1 with the action of the driving assembly. When the movable arm 312 retracts to a certain extent, the connecting plate 314 on the first arm section 313 abuts against the rib 322 on the temporary storage tray 320. The movable arm 312 continues to retract relative to the fixed arm 311 along the symmetry axis S1 with the action of the driving assembly, and pushes the temporary storage tray 320 to enable the temporary storage tray 320 to retract relative to the fixed arm 311 along the symmetry axis S1, thereby pushing the temporary storage tray 320 back to the original position.

It may be understood that the carrying robot of this application may further carry the container on the shelf board 121 of the shelving unit 120 to the stationary rack 400. This process is contrary to the above process, and the details will not be described herein again.

According to the fork and the carrying robot of this application, the sliding assembly is disposed between the fixed arm of the handling device and the temporary storage tray. The sliding assembly is capable of pushing the temporary storage tray to enable the temporary storage tray to extend relative to the fixed arm, and the extending direction of the temporary storage tray is consistent with the extending direction of the movable arm. Therefore, when the fork of this application pulls in or pushes out the goods, the container can be stably transferred between the stationary rack and the temporary storage tray and will not fall off during the transfer.

The technical features in the foregoing embodiments may be randomly combined. For concise description, not all possible combinations of the technical features in the embodiments are described. However, provided that combinations of the technical features do not conflict with each other, the combinations of the technical features are considered as falling within the scope described in this specification.

The foregoing embodiments show only several implementations of this application and are described in detail, which, however, are not to be construed as a limitation to the patent scope of the present utility model. A person of ordinary skill in the art may further make several variations and improvements without departing from the ideas of this application, and such variations and improvements all fall within the protection scope of this application. Therefore, the protection scope of the patent of this application shall be subject to the appended claims.

What is claimed is:

1. A fork configured to transfer a container, the fork comprising:
   a telescopic arm comprising a first arm and a second arm, wherein the second arm is movably connected to the first arm, the second arm being telescopically movable relative to the first arm; and
   a temporary storage tray mounted to the first arm and configured to temporarily store the container, the temporary storage tray being configured to extend or retract relative to the first arm, wherein an extending direction of the temporary storage tray is consistent with an extending direction of the second arm;
   wherein the telescopic arm is configured to push the temporary storage tray so as to cause the temporary storage tray to retract relative to the first arm.

2. The fork according to claim 1, wherein the temporary storage tray is provided with a rib;
   wherein the telescopic arm is configured to push the rib of the temporary storage tray when the telescopic arm is in a state where the telescopic arm is in a process of retracting, so as to cause the temporary storage tray to retract relative to the first arm.

3. The fork according to claim 1, wherein the temporary storage tray is provided with a rib;
   wherein the second arm is configured to abut against the rib so as to cause the temporary storage tray to retract relative to the first arm when the second arm is in a state where the second arm is in a process of retracting relative to the first arm.

4. The fork according to claim 1, wherein the temporary storage tray is provided with a rib;
   wherein the telescopic arm is provided with a plate, the plate being configured to abut against the rib so as to cause the temporary storage tray to retract relative to the first arm.

5. The fork according to claim 1, wherein the telescopic arm further comprises:
   a movable pusher mounted to the second arm and configured to fold or unfold relative to the second arm, the movable pusher being configured to pull the container to the temporary storage tray; and
   a fixed pusher mounted to the second arm, the fixed pusher being configured to push the container away from the temporary storage tray;
   wherein the temporary storage tray is provided with a rib;
   wherein the fixed pusher is further configured to abut against the rib so as to cause the temporary storage tray to retract relative to the first arm when the second arm is in a state where the second arm is in a process of retracting relative to the first arm.

6. The fork according to claim 1, wherein the first arm comprises:
   an underframe; and
   a side wall connected to the underframe;
   wherein the second arm is mounted to the side wall, and the temporary storage tray is at least partially mounted to the underframe.

7. The fork according to claim 1, wherein the second arm comprises:

a first arm section mounted to the first arm and provided with a connecting plate, the first arm section being telescopically movable relative to the first arm; and a second arm section mounted to the first arm section, the second arm section being telescopically movable relative to the first arm section;

wherein the telescopic arm further comprises a driving assembly configured to drive the first arm section to move relative to the first arm by using the connecting plate.

8. The fork according to claim 7, wherein the driving assembly comprises a chain wheel mechanism and a driving member;

wherein the connecting plate is fixedly connected to a link chain of the chain wheel mechanism, the chain wheel mechanism being configured to drive the first arm section to move relative to the first arm by using the connecting plate.

9. The fork according to claim 7, wherein the driving assembly comprises a pulley mechanism and a driving member;

wherein the pulley mechanism is configured to drive the first arm section to move relative to the first arm by using the connecting plate.

10. The fork according to claim 7, wherein the temporary storage tray is provided with a rib;

wherein the connecting plate is configured to abut against the rib so as to enable the temporary storage tray to retract with the second arm relative to the first arm.

11. A fork configured to transfer a container, the fork comprising:

a telescopic arm comprising a first arm and a second arm, wherein the second arm is movably connected to the first arm, the second arm being telescopically movable relative to the first arm;

a temporary storage tray mounted to the first arm and configured to temporarily store the container, the temporary storage tray being configured to extend or retract relative to the first arm, wherein an extending direction of the temporary storage tray is consistent with an extending direction of the second arm; and an elastic piece configured to push or pull the temporary storage tray with an elastic force so as to cause the temporary storage tray to extend relative to the first arm.

12. The fork according to claim 11, wherein the elastic piece comprises a spring.

13. The fork according to claim 12, wherein the spring is a compression spring or a tension spring.

14. The fork according to claim 11, wherein the telescopic arm is configured to push the temporary storage tray when the telescopic arm is in a state where the telescopic arm is in a process of retracting, so as to cause the temporary storage tray to retract relative to the first arm.

15. The fork according to claim 11, wherein the temporary storage tray is provided with a rib;

wherein the second arm is configured to abut against the rib of the temporary storage tray so as to cause the temporary storage tray to retract relative to the first arm when the second arm is in a state where the second arm is in a process of retracting.

16. The fork according to claim 11, wherein an end of the temporary storage tray is closer to a stationary rack when the temporary storage tray is in a state where the temporary storage tray is extended relative to the first arm.

17. The fork according to claim 11, wherein the first arm comprises:

an underframe; and a side wall connected to the underframe;

wherein the second arm is mounted to the side wall, and the temporary storage tray is directly or indirectly mounted to the underframe.

18. The fork according to claim 11, wherein an end of the elastic piece is coupled to the first arm and another end of the elastic piece is coupled to the temporary storage tray.

19. A method for controlling a fork to transfer a container, the fork comprising:

a telescopic arm comprising a first arm, a second arm, a pusher assembly and a driving assembly, wherein the second arm is movably connected to the first arm, the second arm being telescopically movable relative to the first arm with an action of the driving assembly, the pusher assembly being mounted to the second arm and configured to push or pull the container; and a temporary storage tray connected to the first arm and configured to temporarily store the container, the temporary storage tray being configured to extend or retract relative to the first arm, wherein an extending direction of the temporary storage tray is consistent with an extending direction of the second arm;

wherein the method comprises:

extending, by the second arm, relative to the first arm with the action of the driving assembly;

pushing, by the pusher assembly, the container away from the temporary storage tray;

in response to extension of the second arm, pushing or pulling the temporary storage tray with an elastic force so as to cause the temporary storage tray to extend relative to the first arm; and extending, by the temporary storage tray, relative to the first arm so as to protrude from the first arm.

20. The method according to claim 19, further comprising:

retracting, by the second arm, relative to the first arm with the action of the driving assembly;

in response to retraction of the second arm, pushing, by the second arm, the temporary storage tray so as to cause the temporary storage tray to retract relative to the first arm; and retracting, by the temporary storage tray, relative to the first arm.

21. A method for controlling a fork to transfer a container, the fork comprising:

a telescopic arm comprising a first arm, a second arm, and a driving assembly, wherein the second arm is movably connected to the first arm, the second arm being telescopically movable relative to the first arm with an action of the driving assembly; and a temporary storage tray connected to the first arm and configured to temporarily store the container, the temporary storage tray being configured to extend or retract relative to the first arm, wherein an extending direction of the temporary storage tray is consistent with an extending direction of the second arm;

wherein the method comprises:

retracting, by the second arm, relative to the first arm with the action of the driving assembly so as to pull the container to the temporary storage tray;

in response to retraction of the second arm, pushing, by the second arm, the temporary storage tray so as to cause the temporary storage tray to retract relative to the first arm; and retracting, by the temporary storage tray, relative to the first arm.

* * * * *